No. 875,435. PATENTED DEC. 31, 1907.
W. A. JOHNSTON.
CULINARY SCRAPER.
APPLICATION FILED JAN. 24, 1907.
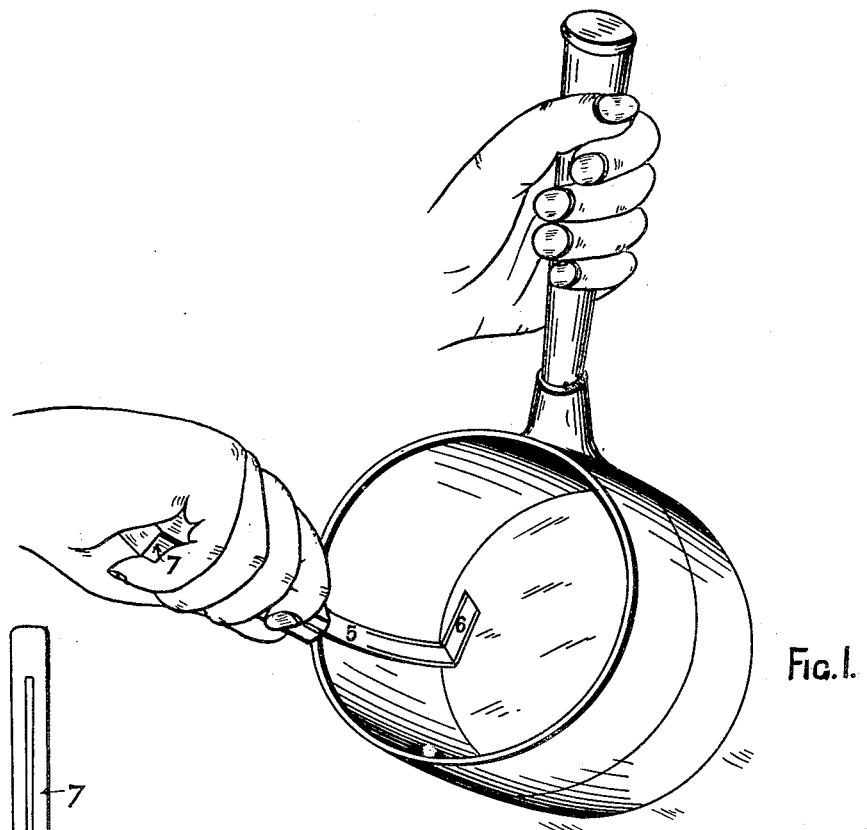
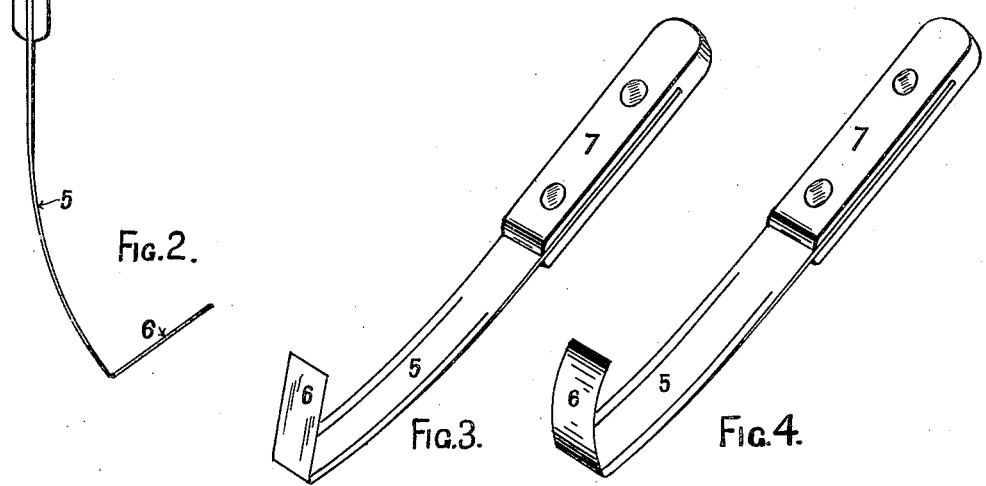

UNITED STATES PATENT OFFICE.

WILLIAM ALEXANDER JOHNSTON, OF SANDY BAY, HOBART, TASMANIA, AUSTRALIA.

CULINARY SCRAPER.

No. 875,435.  Specification of Letters Patent.  Patented Dec. 31, 1907.

Application filed January 24, 1907. Serial No. 353,801.

*To all whom it may concern:*

Be it known that I, WILLIAM ALEXANDER JOHNSTON, a subject of the King of Great Britain and Ireland, residing at 30 Princess street, Sandy Bay, Hobart, in the State of Tasmania, Commonwealth of Australia, have invented certain new and useful Improvements in Culinary Scrapers; and I do hereby declare that the following is a full, clear, and exact description of the same.

The usual method of cleaning the insides of saucepans, frying pans and the like by scraping them with a knife is obviously slow, tedious and unsatisfactory and the purpose of this invention is to provide an implement with which this operation can be performed with ease, celerity and effectiveness.

The implement consists of a flexible two-edged blade curved to correspond with the contour of the side of a saucepan, while the end is bent at an angle similar to that formed by the side and bottom.

In order that the invention may be clearly understood reference will now be made to the accompanying sheet of drawings in which:—

Figure 1 shows the implement in use within a saucepan. Fig. 2, is an edge view of an implement with a rectilinear end piece. Fig. 3, is a perspective view of the implement shown in Fig. 2. Fig. 4, is a modification of the implement shown in Figs. 2, and 3, having in this instance a curvilinear end piece.

5 is the blade of which 6 is the bent end piece which may be made flat as shown in Fig. 3 or curved as shown in Fig. 4 for the purpose of dealing with saucepans, boilers or the like whose bottom contours are of different constructions.

7 is the handle.

When it is desired to scrape out a saucepan it is only necessary to sweep the implement round the inner face of the side when the blade, being curved and flexible, will adapt itself to the contour of the saucepan, while the angle formed by the blade and its bent end piece will clean out all the material in the angle formed by the bottom and side of the saucepan. It is in this latter operation that the chief utility of the implement will be found.

What I claim and desire to secure by Letters Patent is:—

An implement for cleaning the insides of culinary utensils consisting of a curved flexible double edged blade part, a double edged end part arranged at an angle to the blade part, to enter the angle formed between the bottom and side of the culinary utensil, with the side faces of the blade and end part in angularly disposed planes and a handle for the blade part.

In testimony whereof I affix my signature in the presence of two witnesses.

WILLIAM ALEXANDER JOHNSTON.

Witnesses:
 EDWARD FREEMAN,
 H. R. McGUIRE.